6368½X
J. C. Strode,
Water Wheel,
Patented Feb. 8, 1831.
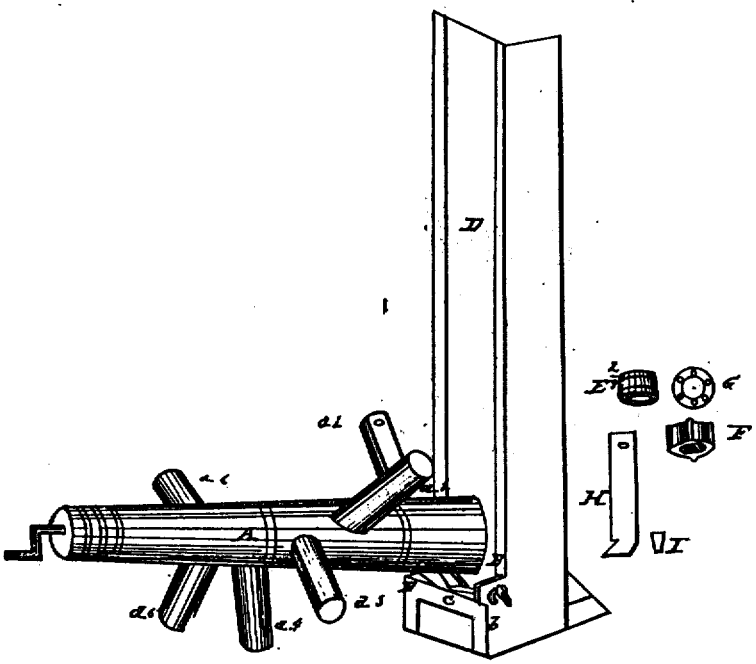
N. PETERS, PHOTO-LITHOGRAPHER, WASHINGTON, D. C.

6368 1/2 X

Joseph C. Strode
Letters Patent

The Schedule referred to in these Letters Patent and making part of the same containing a description in the words of the said Joseph C. Strode himself of his improvement in the machine for impelling saw mills & other works by water called Strode's Reaction Water Wheel.

---

To all to whom these presents shall come. Joseph C. Strode of East Bradford in the County of Chester and State of Pennsylvania Teacher sendeth greeting. Be it known that I, Joseph C. Strode have invented constructed and applied to use a new and useful machine for impelling saw Mills & other works by water called Strodes Reaction Water Wheel and specified in the words following, viz. [illegible] a wooden shaft seven feet six inches long eighteen inches in diameter at the larger end and fourteen at the smaller. in the centre of this shaft is made a round hole eight inches in diameter at the larger end, and six at the other. The area of this hole will vary directly as the power required and inversely as the subduplicate ratio of the height of the head above the centre of the shaft. [illegible] arms eight [illegible] inches in diameter set perpendicularly in the shaft at equal [illegible] distances forming a true spiral curve from one end to the other. The holes through these arms are three and a half inches in diameter [illegible] of each arm is a hole one and three quarters inch in diameter so situated that the axis of the shaft is perpendicular to the plane passing thro' the axis of the hole & that of the arm and so that a plane passing thro' the axis of the hole perpendicular to the aforesaid plane shall be a tangent to the circle formed by the revolution of the axis of the hole by the revolution of the machine on its axis. The distance of the centre of this hole from the centre of the shaft is thirty three inches and [illegible] directly as the power required and the subduplicate ratio of the height of the head above the centre of the shaft [illegible] inversely as the number of revolutions [illegible]. The area of the hole [illegible] directly as the subduplicate ratio of the height of the head [illegible] the power required. The distance between each [illegible] the planes passing thro' the axis of the arms [illegible] the axis of the shaft [illegible] perpendicular [illegible] inches [illegible] the centre from [illegible]

2/8/1831 6368 [illegible]

such commences the buoyancy [illegible] would impinge against the back of the [illegible]
& thereby impede its motion. so that if the number of arms be increased the length of the
shaft must be increased in proportion. The arms are made fast in the shaft by
means of a tenon with a dove tail as represented by figure [illegible]. the side of the ten-
on on which the dove tail is made is rather narrower than the opposite side
& the mortise in the shaft is of the same shape so that when the wedge [illegible] is driven
in on the side opposite to the dove tail it will be firm & tight on all sides.
E is a hollow cylinder eight inches in length with a rim on one end one inch
and a quarter wide & three quarters of an inch thick. The diameter of the hole
is eight inches the same as that in the shaft A. Its diameter from out to out is
nine inches and a half half its length. The other half or the part h. is nine inches
and a quarter at the shoulder where g. terminates, tapering to the end where it
is nine inches. This cylinder is let thro' the plank D. of the trunk which is three
inches thick with its rim on the inside which is sunk in the plank three
quarters of an inch deep so as to face with the inside of the plank; It is made
at the same time firm & water tight by means of eight screw bolts (each three
inches and a half long) driven in from the outside thro' holes made in the rim
where (h) is screwed up firmly and rendered tight by means of [illegible]. The
part h, is four inches in length and goes into the cylinder E, which is of the
same length & is made fast in the shaft. It has four wings to keep it from turn-
ing. This cylinder is of such a capacity that it will work easily on the part
h and at the same time not allow too much play. G is a lead washer one
inch and a quarter wide, three eighths of an inch thick and its inner diam-
eter eight inches. This washer and an iron follower of the same dimensions
are screwed against the end of h. and E (which are turned so as to fit ex-
actly) by means of eight screws going thro' them and screwing into the end
of h. This is in order to make it water tight. B is a cast iron friction wheel
fourteen inches in diameter moving with its periphery [illegible] is turned
true against the [illegible] in the shaft [illegible] the [illegible] being also turned
thereby supporting the weight of the shaft A. [illegible]
on the [illegible] of figure [illegible]. The [illegible] of the [illegible]
[illegible]
[illegible]

[illegible] the [illegible] are made [illegible] at the [illegible] by the [illegible] c, going across
from one to the other and nailed to each. In the foregoing description are
given the dimensions of a [illegible] [illegible] operation for [illegible] a saw
mill under a head of twenty feet. If a larger or smaller wheel is required,
the dimensions of the several parts will vary according to the proportions
given. Some additional power may be obtained by the application of a
funnel to each of the holes in the ends of the arms 2, 2, 2, 2, 2, 2, the small
end of the funnel being applied to the hole and the wide end standing
outwards. These funnels may be made of small blocks of wood with a
hole bored thro' the middle of each and hollowed on the inferior side
so as to fit the arms to which they may be attached firmly by nails or
screws. The holes in the blocks should correspond in capacity & position
on the inferior sides with the holes in the arms and should gradually wid-
en in the true funnel shape toward the outward surface of the blocks. These
funnels may or may not be attached at the option of the constructor. The
machine will operate very well without them, though it is believed from
experiment with some increase of power with them. If a reciprocating
movement is desired it may be obtained by means of a crank on the axle
of the shaft [illegible]. In the machine above described the crank is at the end
of the axle, but if the axle a little prolonged be made to work on a point fix-
ed in a permanent block placed directly opposite the smaller extremity
of the shaft & in the intermediate space between the end of the shaft & the block
the axle be so shaped as to form a crank by which the reciprocating movement
may be given. there will be less friction & consequently a gain of power.
In testimony that the above is a true specification of my said invention
as above described I have hereto set my hand & seal this twelfth day of
January in the year of our Lord one thousand eight hundred & thirty one Witnesses
[illegible] [illegible]
[illegible] [illegible]

Joseph C. [illegible]

Exd
[illegible]